(12) United States Patent
Liang et al.

(10) Patent No.: US 12,039,275 B2
(45) Date of Patent: Jul. 16, 2024

(54) METHOD OF MACHINE LEARNING AND INFORMATION PROCESSING APPARATUS

(71) Applicant: FUJITSU LIMITED, Kawasaki (JP)

(72) Inventors: Jun Liang, Kawasaki (JP); Hajime Morita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 253 days.

(21) Appl. No.: 17/683,406

(22) Filed: Mar. 1, 2022

(65) Prior Publication Data

US 2022/0366142 A1 Nov. 17, 2022

(30) Foreign Application Priority Data

May 11, 2021 (JP) ................. 2021-080360

(51) Int. Cl.
*G06F 40/295* (2020.01)
*G06N 20/00* (2019.01)

(52) U.S. Cl.
CPC ........... *G06F 40/295* (2020.01); *G06N 20/00* (2019.01)

(58) Field of Classification Search
CPC .............................. G06F 40/295; G06N 20/00
USPC ................. 704/222, 231, 251, 259
See application file for complete search history.

(56) References Cited

U.S. PATENT DOCUMENTS

| 2016/0027433 | A1  | 1/2016  | Itoh et al. |
| 2020/0301968 | A1* | 9/2020  | Huang ................. G06F 11/3664 |
| 2020/0311201 | A1* | 10/2020 | Sainani ................. G06N 3/044 |

FOREIGN PATENT DOCUMENTS

| JP | 2016-024759 A | 2/2016 |
| JP | 2016-162308 A | 9/2016 |

OTHER PUBLICATIONS

Suchin Gururangan et al, "Don't Stop Pretraining: Adapt Language Models to Domains and Tasks", arXiv:2004.10964v3 [cs.CL], May 5, 2020 (Total 19 pages).
Suchin Gururangan et al., "Variational Pretraining for Semi-supervised Text Classification", arXiv:1906.02242v1 [cs.CL], Jun. 5, 2019 (Total 15 pages).

* cited by examiner

*Primary Examiner* — George C Monikang
(74) *Attorney, Agent, or Firm* — Fujitsu Intellectual Property Center

(57) ABSTRACT

A non-transitory computer-readable recording medium stores a program for causing a computer to execute a process, the process includes identifying first named entities and first verbs in a dependent relationship respectively with the first named entities from each of a plurality of sentences, vectorizing each of the plurality of sentences based on the first named entities and the first verbs, identifying, out of the plurality of sentences, one or more sentences each having a similarity greater than or equal to a threshold with respect to a specific sentence based on a plurality of vectors generated by the vectorizing, the similarity between two sentences being defined as a similarity between vectors generated by vectorizing the two sentences, and executing training of a machine learning model based on the one or more sentences.

5 Claims, 10 Drawing Sheets

SENTENCE OF DOWNSTREAM TASK sentence_1: the force-distance curves were analyzed to determine the physical and nanomechanical properties of L. lactis pili.

METHOD OF MACHINE LEARNING AND INFORMATION PROCESSING APPARATUS

CROSS-REFERENCE TO RELATED APPLICATION

This application is based upon and claims the benefit of priority of the prior Japanese Patent Application No. 2021-80360, filed on May 11, 2021, the entire contents of which are incorporated herein by reference.

FIELD

The embodiment discussed herein is related to a method of machine learning and an information processing apparatus.

BACKGROUND

In many fields in which machine learning models are used, techniques related to domain adaptation are used. In the domain adaptation, a machine learning model generated by using training data of a certain domain is applied to another domain. The domain adaptation applies knowledge obtained from a source domain having sufficient training data to a target domain being a target, thereby generating a classifier or the like that operates with high accuracy in the target domain. Herein, the domain refers to, for example, a collection of data.

For example, in the field of the natural language processing, when a pretrained language model generated by using the source domain is applied to the target domain side, the pretrained language model is retrained by using training data on the target domain side.

Japanese Laid-open Patent Publication No. 2016-024759 and Japanese Laid-open Patent Publication No. 2016-162308 are disclosed as related art.

SUMMARY

According to an aspect of the embodiment, a non-transitory computer-readable recording medium stores a program for causing a computer to execute a process, the process includes identifying first named entities and first verbs in a dependent relationship respectively with the first named entities from each of a plurality of sentences, vectorizing each of the plurality of sentences based on the first named entities and the first verbs, identifying, out of the plurality of sentences, one or more sentences each having a similarity greater than or equal to a threshold with respect to a specific sentence based on a plurality of vectors generated by the vectorizing, the similarity between two sentences being defined as a similarity between vectors generated by vectorizing the two sentences, and executing training of a machine learning model based on the one or more sentences.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

When the machine learning model is retrained by using the training data on the domain side, inappropriate training data may be included, and the accuracy of the machine learning model after the retraining may be degraded. For example, since the training data belonging to various subdomains is included in the target domain, when retraining of the machine learning model to be applied to a specific subdomain is executed, corresponding training data is selected from the target domain. However, when this selection is not accurate, training data of various subdomains is included, and the accuracy of the machine learning model is degraded.

An embodiment disclosed herein will be described in detail based on the drawings. The present embodiment does not limit the disclosure.

Figure 1:
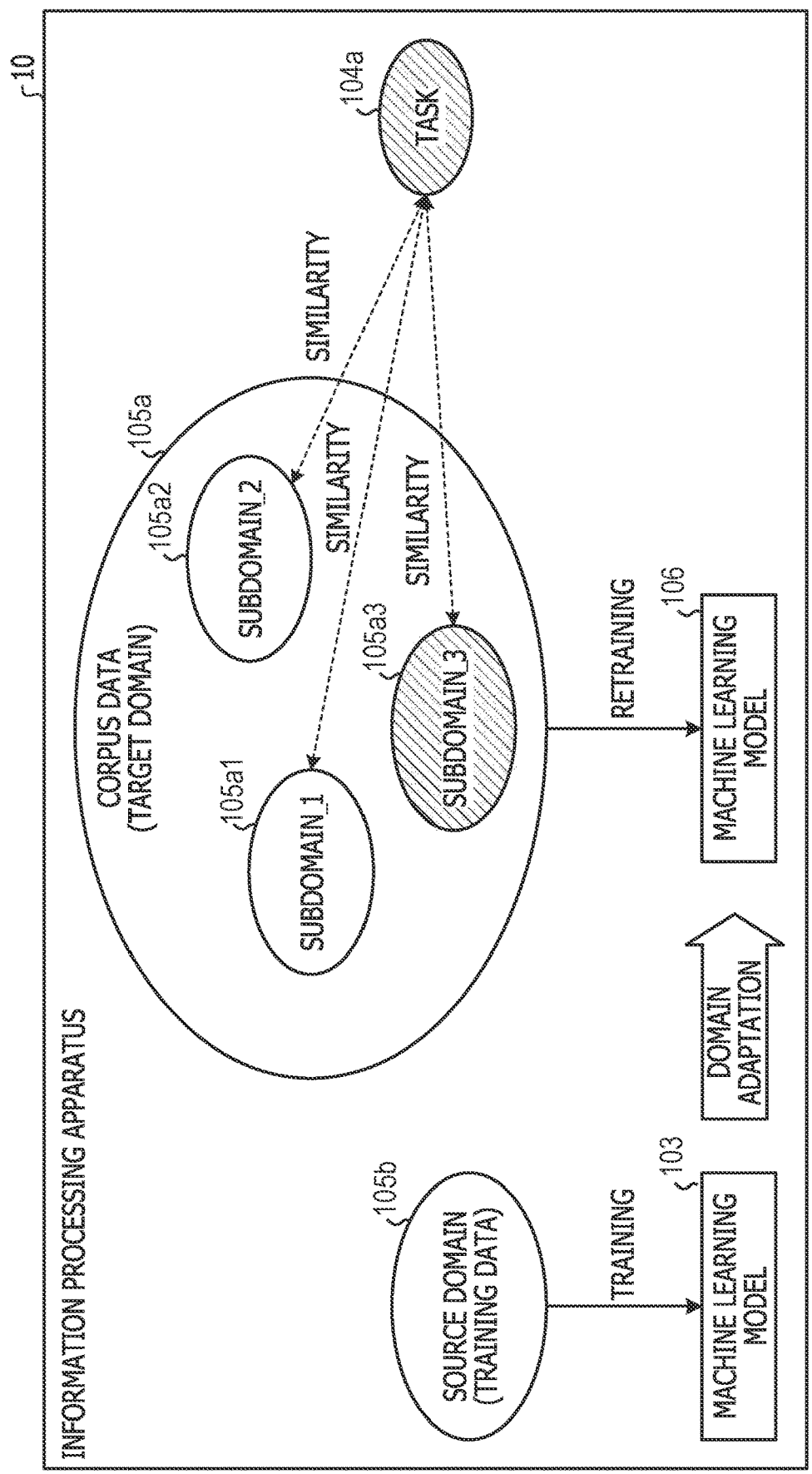
FIG. 1 is a diagram describing an information processing apparatus according to an embodiment.

FIG. 1 is a diagram describing an information processing apparatus 10 according to the embodiment. In generating a machine learning model 106 to be applied to a certain task 104a, the information processing apparatus 10 illustrated in FIG. 1 extracts appropriate data from data included in corpus data 105a and generates the machine learning model 106 through machine learning in which the extracted data is used as training data.

Although domain adaptation of a machine learning model is described as an example in the present embodiment, the present embodiment may be applied to another situation such as generation of a machine learning model. For example, description is made with an example in which the information processing apparatus 10 causes a machine learning model 103 generated by using data of a source domain 105b as training data to be domain adapted through retraining the machine learning model 103 with data of an appropriate subdomain_3 105a3 from a target domain 105a including a plurality of subdomains subdomain_1 105a1, subdomain_2 105a2, and subdomain_3 105a3.

As the domain adaptation, a technique of selecting training data to be used for the domain adaptation based on the similarity between two sentences based on the Bag-of-Words (BoW) is often used. However, with this technique, since the syntactic information of verbs and the named entities of sentences are not considered in calculation of similarity, data selection is insufficient, and the accuracy of the machine learning model after the domain adaptation may be poor.

For example, an example in which a machine learning model is domain adapted to a biomedical subdomain is considered. That is, an example is considered in which only the named entity recognition (NER) of the biomedical subdomain is performed as the downstream task. Since a term such as "*Lactococcus lactis*" is used in both the biomedical subdomain and the news subdomain, both the subdomains are selected as corpus data (training data) for the domain adaptation. As a result, since the machine learning model is trained so as to be applied to both the biomedical subdomain and the news subdomain, the accuracy for data of the biomedical subdomain (downstream task) decreases.

Accordingly, the information processing apparatus 10 according to the present embodiment selects training data for the domain adaptation by using syntactic information based on combinations of the named entities and verbs appearing in sentences so as to suppress degradation of the accuracy of the machine learning model.

For example, the information processing apparatus 10 identifies named entities and verbs in a dependent relationship with the named entities from each of the plurality of sentences included in the target domain. Then, based on the named entities and the verbs in the dependent relationship with the named entities, the information processing apparatus 10 vectorizes each of the plurality of sentences. Based on a plurality of vectors generated by the vectorization process, the information processing apparatus 10 identifies, from the plurality of sentences, one or more sentences similar to, to the degree greater than or equal to a threshold, the specific sentence corresponding to the downstream task. Then, the information processing apparatus 10 executes the domain adaptation of the machine learning model by training the machine learning model based on the identified one or more sentences.

For example, the information processing apparatus 10 generates, as a comparison target of each sentence, a vector (vector data) obtained by combining a named entity and a verb. By comparing the vectors of the sentences, the information processing apparatus 10 selects sentences similar to the vector of the sentence of the downstream task as the training data for domain adaptation. Then, the information processing apparatus 10 executes retraining of the machine learning model by using the selected training data (sentences).

As described above, since the information processing apparatus 10 vectorizes the feature amount of the sentences of the downstream task, selects the training data for the domain adaptation by similarity determination using vector values, and executes the retraining, degradation of the accuracy of the machine learning model after the domain adaptation may be suppressed.

Figure 2:
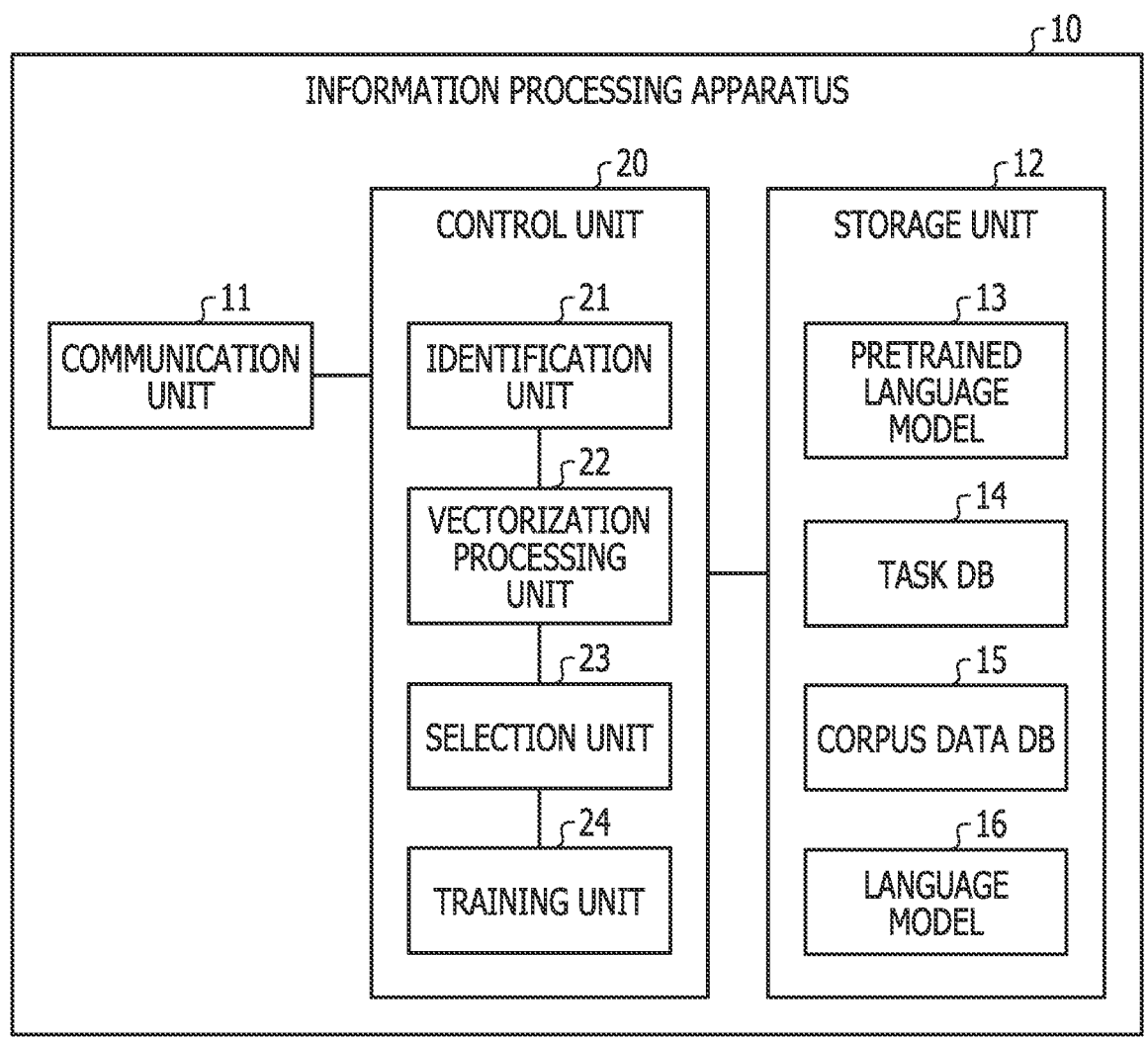
FIG. 2 is a functional block diagram illustrating a functional configuration of the information processing apparatus according to the embodiment.

FIG. 2 is a functional block diagram illustrating a functional configuration of the information processing apparatus 10 according to the present embodiment. As illustrated in FIG. 2, the information processing apparatus 10 includes a communication unit 11, a storage unit 12, and a control unit 20.

The communication unit 11 controls communication with another apparatus. For example, the communication unit 11 obtains a machine learning model generated by using a source domain from an administrator terminal or the like and transmits a result of processing performed by the control unit 20 to the administrator terminal or the like.

The storage unit 12 stores various types of data, a program to be executed by the control unit 20, and so forth. This storage unit 12 stores a pretrained language model 13, a task database (DB) 14, a corpus data DB 15, and a language model 16.

The pretrained language model 13 is a machine learning model generated by using training data belonging to the source domain. For example, the pretrained language model 13 is a machine learning model to be domain adapted, is an example of a machine learning model that executes extraction of named entities, and converts, for example, sentences into vector representation.

The task DB 14 is a database that stores at least one sentence corresponding to a task to be determined by the domain adapted machine learning model. That is, the sentence stored in the task DB 14 corresponds to the above downstream task or a specific sentence. For example, the task DB 14 stores the sentence belonging to a biomedical subdomain.

Figure 3:
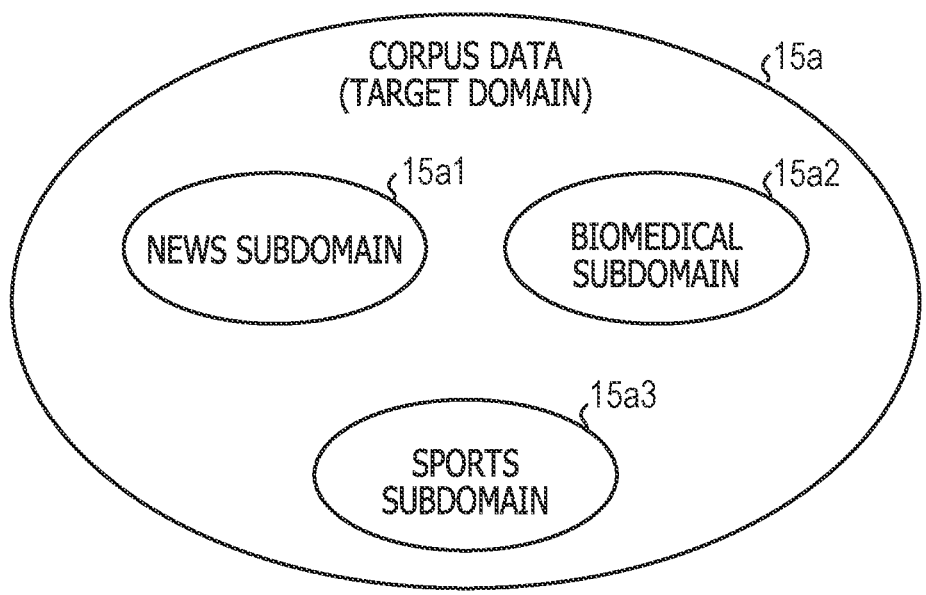
FIG. 3 is a diagram illustrating an example of information stored in a corpus data database (DB)

The corpus data DB 15 is a database that stores sentences used for the domain adaptation of the pretrained language model 13. The corpus data DB 15 stores sentences divided into a plurality of subdomains corresponding to the target domain. FIG. 3 is a diagram illustrating an example of information stored in the corpus data DB 15. As illustrated in FIG. 3, the corpus data DB 15 stores corpus data 15*a* including sentences belonging to a news subdomain 15*a*1, sentences belonging to a biomedical subdomain 15*a*2, sentences belonging to a sports subdomain 15*a*3, and so forth.

The language model 16 is a language model to which a domain has been applied. That is, the language model 16 is a machine learning model for the NER finally generated by the information processing apparatus 10. When description is made with the above example, the language model 16 is a machine learning model in which the pretrained language model 13 is domain adapted to the downstream task.

The control unit 20 is a processing unit that administers the entire information processing apparatus 10 and includes an identification unit 21, a vectorization processing unit 22, a selection unit 23, and a training unit 24.

The identification unit 21 identifies named entities and verbs in the dependent relationship with the named entities from each of the plurality of sentences. For example, the identification unit 21 identifies named entities and verbs in the dependent relationship with the named entities for each sentence corresponding to the downstream task stored in the task DB 14 and each sentence belonging to the target domain stored in the corpus data DB 15. As the dependent relationship, for example, a distance, a combination assumed in advance, or the like may be adopted. For example, the identification unit 21 identifies a verb that appears at a position closest to a named entity and generates a combination of the named entity and the verb.

Based on the named entities and the verbs in the dependent relationship with the named entities, the vectorization processing unit 22 vectorizes each of the plurality of sentences. For example, the vectorization processing unit 22 vectorizes each of the sentences corresponding to the downstream task by vectorizing each of the combinations identified by the identification unit 21 for each of the sentences. For each of the sentences belonging to the target domain, the vectorization processing unit 22 vectorizes each of the combinations identified by the identification unit 21 to vectorize each of the sentences. An example of vectorization will be described later.

Based on a plurality of vectors generated by the vectorization process performed by the vectorization processing unit 22, the selection unit 23 identifies, from among the sentences belonging to the target domain, one or more sentences similar to the downstream task to the degree greater than or equal to a threshold. That is, the selection unit 23 selects the sentences appropriate for the domain adaptation.

Based on the one or more sentences selected by the selection unit 23, the training unit 24 executes machine learning of the pretrained language model 13. That is, the training unit 24 generates the domain adapted language model 16 by executing the machine learning of the pretrained language model 13 by using the sentences of the target domain selected by the selection unit 23. Then, the training unit 24 stores the generated language model 16 in the storage unit 12.

Figure 4:
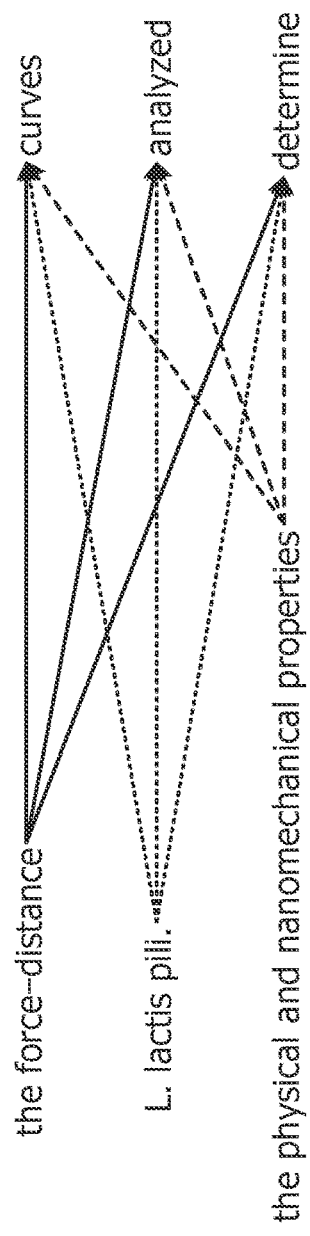
FIG. 4 is a diagram describing an example of identification of sets of a named entity and a verb of a sentence.

A process of the above-described domain adaptation is described in detail. FIG. 4 is a diagram describing an example of identification of sets of a named entity and a verb of a sentence. Although description is made with a sentence belonging to the downstream task as an example, the same processing is executed for the sentences belonging to the target domain.

As illustrated in FIG. 4, the identification unit 21 executes a morphological analysis or the like of sentence_1 "the force-distance curves were analyzed to determine the physical and nanomechanical properties of *L. lactis* pili." As the named entities, the identification unit 21 extracts "the force-distance", "*L. lactis* pili.", and "the physical and nanomechanical properties". Likewise, the identification unit 21 identifies "curves", "analyzed", and "determine" as the verbs.

Next, the vectorization processing unit 22 vectorizes the sentence by using the sets of the named entity and the verb. For example, the vectorization processing unit 22 vectorizes a set of a named entity identified by the identification unit 21 and a verb closest to the named entity to calculate "syntactic representation".

Figure 5:
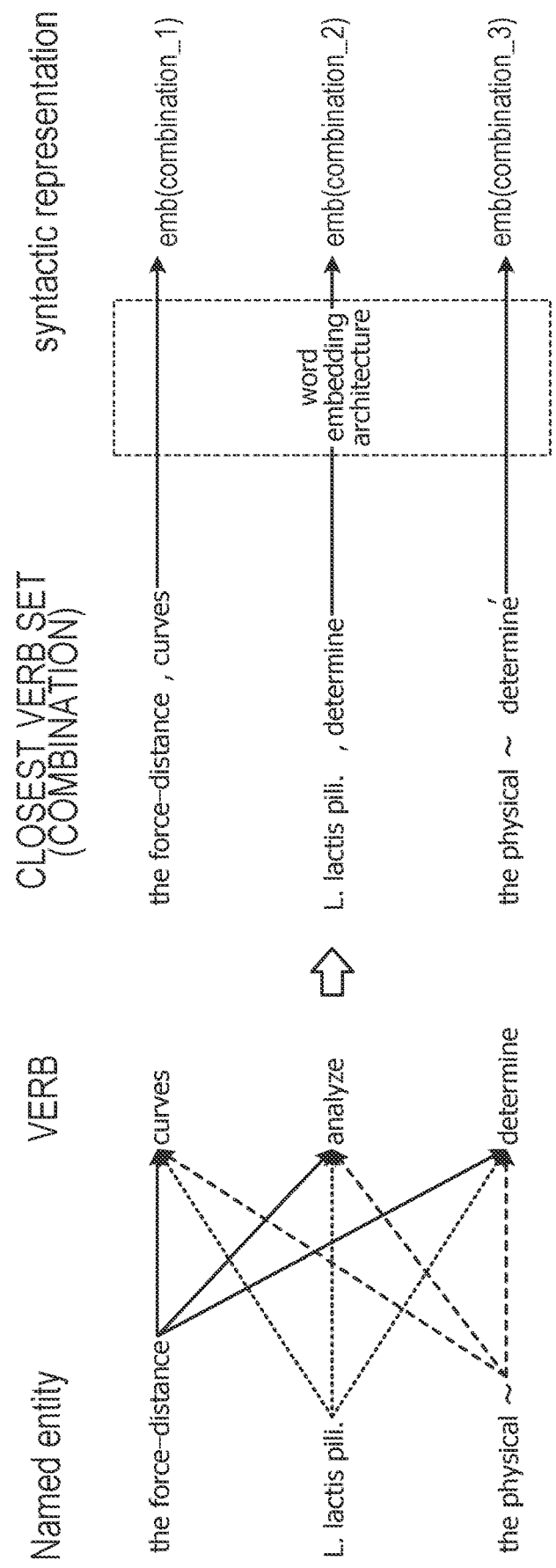
FIG. 5 is a diagram describing an example of calculation of a syntactic representation of verb sets in each sentence.
Figure 6:
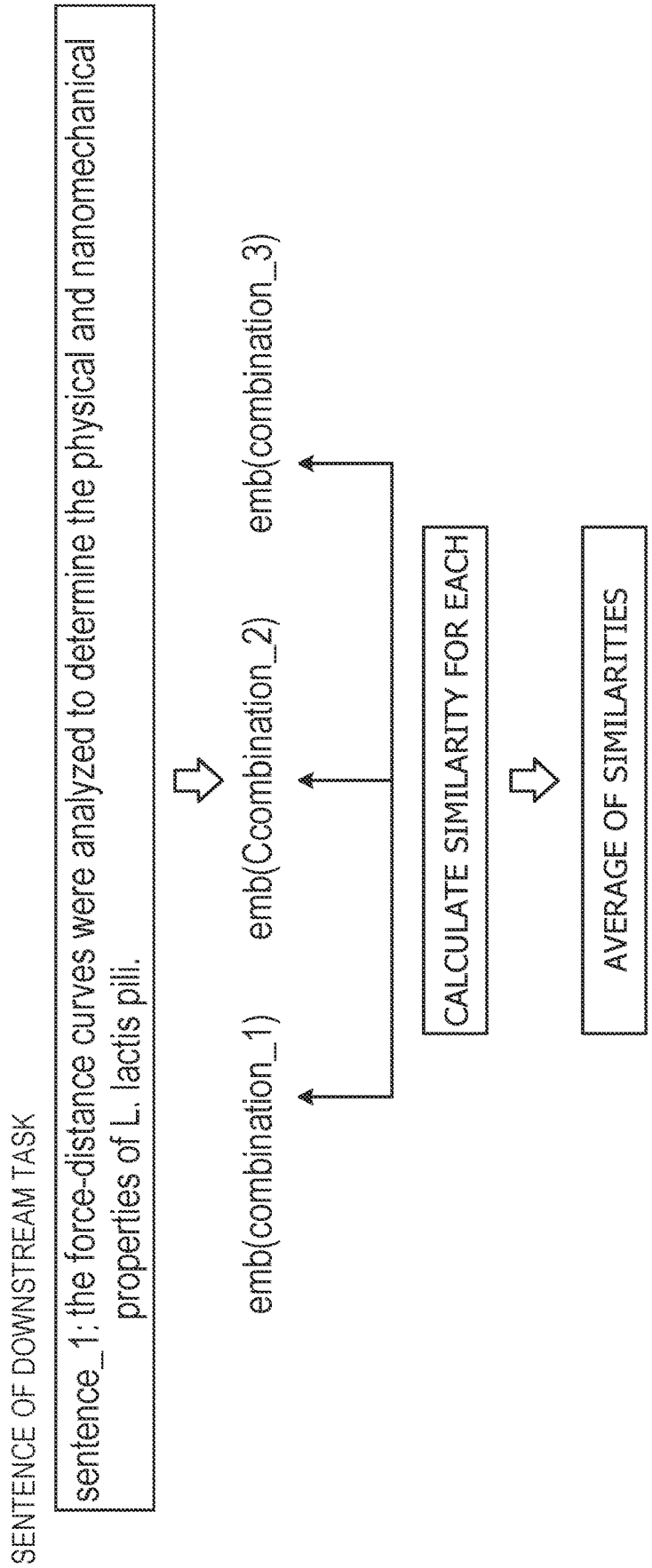
FIG. 6 is a diagram describing an example of calculation of a syntactic representation of the sentence.

FIG. 5 is a diagram describing an example of calculation of a syntactic representation of verb sets in each of the sentences, and FIG. 6 is a diagram describing an example of calculation of a syntactic representation of the sentence.

As illustrated in FIG. 5, the vectorization processing unit 22 identifies combination_1 "the force-distance, curves", combination_2 "*L. lactis* pili., determine", and combination_3 "the physical and nanomechanical properties, determine" as the closest verb sets (combinations) in accordance with appearance positions of the named entities and the verbs. The vectorization processing unit 22 inputs each of combination_1, combination_2, and combination_3 to a "word embedding architecture" being an example of a machine learning model having been generated and generates emb(combination_1), emb(combination_2), and emb(combination_3) that are vector representations (vector data).

In a way as described above, the vectorization processing unit 22 generates the vector representations "emb(combination_1), emb(combination_2), emb(combination_3)" for sentence_1 "the force-distance curves were analyzed to determine the physical and nanomechanical properties of *L. lactis* pili."

Then, the vectorization processing unit 22 generates an integrated vector representation of the entirety of sentence_1. As illustrated in FIG. 6, for example, the vectorization processing unit 22 calculates the similarity of each of emb(combination_1), emb(combination_2), and emb(combination_3) and calculates an average of the similarities as the "syntactic representation". A known calculation technique such as the cosine similarity or the Euclidean distance may be used to calculate the similarity. The syntactic representation is not limited to the average of the similarities and may be an average of the vector representations (average vector) or total of the vector representations.

Next, the selection unit 23 selects corpus data for the domain adaptation based on the similarity of "syntactic representation" of each sentence generated by the vectorization processing unit 22.

Figure 7:
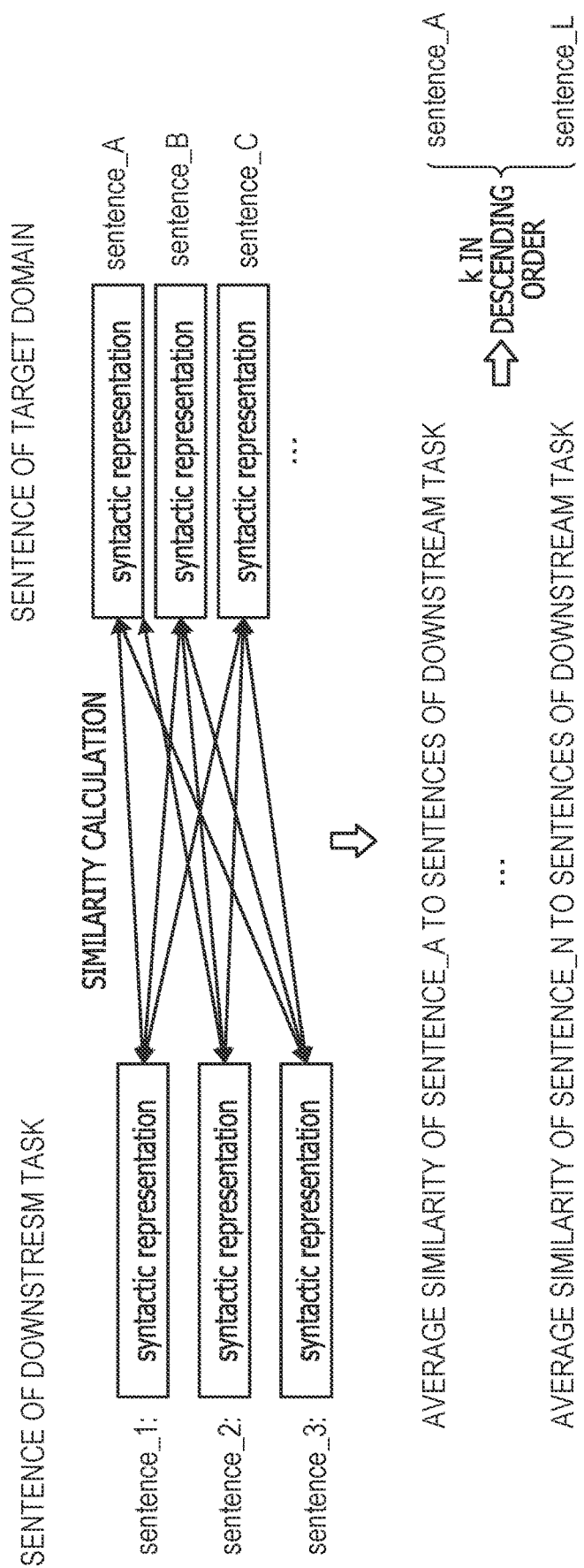
FIG. 7 is a diagram describing an example of selecting corpus data.

FIG. 7 is a diagram describing an example of selecting corpus data. As illustrated in FIG. 7, the vectorization processing unit 22 calculates the above "syntactic representation" for each of "sentence_1, sentence_2, and sentence_3" belonging to the downstream task. Likewise, the vectorization processing unit 22 calculates the above "syntactic representation" for each of "sentence_A, sentence_B, and sentence_C, . . . " belonging to the target domain.

The selection unit 23 calculates the similarity between "syntactic representation" of each of "sentence_1, sentence_2, and sentence_3" belonging to the downstream task and "syntactic representation" of each sentence belonging to the target domain. A known calculation technique such as the cosine similarity or the Euclidean distance may be used to calculate the similarity.

Next, the selection unit 23 calculates an average similarity of sentence_A of the target domain to the sentences belonging to the downstream task (sentence_1, sentence_2, and sentence_3). For example, the selection unit 23 calculates the similarity between sentence_A of the target domain and sentence_1, the similarity between sentence_A of the target domain and sentence_2, and the similarity between sentence_A of the target domain and sentence_3. The selection unit 23 calculates the average of the similarities for sentence_A.

Likewise, the selection unit 23 calculates an average similarity of sentence_B of the target domain to the sentences belonging to the downstream task (sentence_1, sentence_2, and sentence_3) and calculates an average similarity of sentence_C of the target domain to the sentences belonging to the downstream task (sentence_1, sentence_2, and sentence_3). Then, the selection unit 23 selects k sentences (sentence_A, . . . , sentence_L) in descending order of the averages from among the sentences of the target domain and generates new corpus data.

Figure 8:
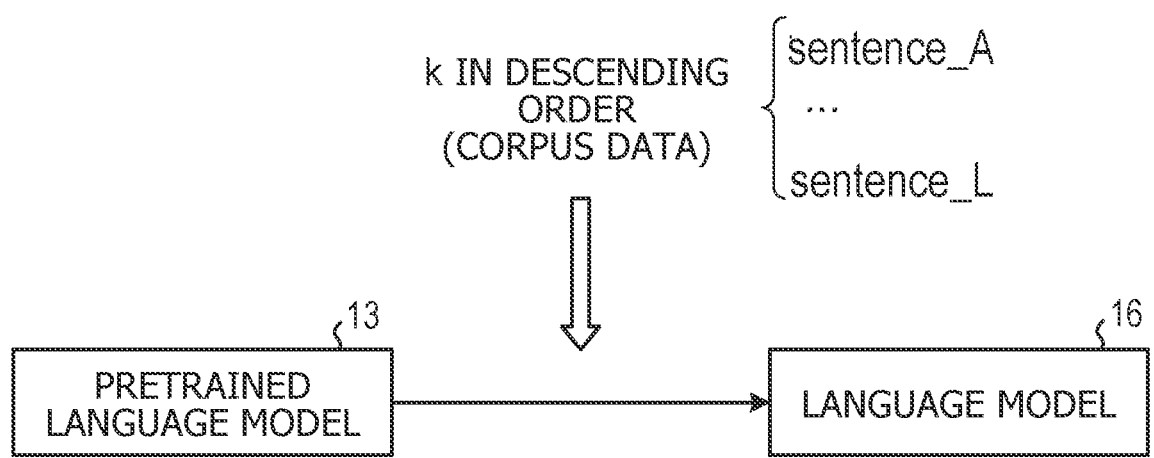
FIG. 8 is a diagram describing training using the corpus data.

Next, the training unit 24 executes training of the machine learning model by using the sentences selected by the selection unit 23. FIG. 8 is a diagram describing the training by using the corpus data. As illustrated in FIG. 8, the training unit 24 executes retraining of the pretrained language model 13 by using the k sentences in descending order that are the new corpus data and generates the domain adapted language model 16.

Regarding a training technique, a known training technique for a machine learning model using the NER may be adopted. For example, when the downstream task is a "biomedical domain", the training unit 24 extracts the named entities of each selected sentence, performs vectorization, and assigns a label "biomedical domain" to each vector representation obtained from the sentences. The training unit 24 inputs each of the vectors to the pretrained language model 13, executes training of the pretrained language model 13 so that the pretrained language model 13 recognizes each named entity as a named entity of the "biomedical domain", and generates the language model 16 adapted to the domain of the downstream task.

Figure 9:
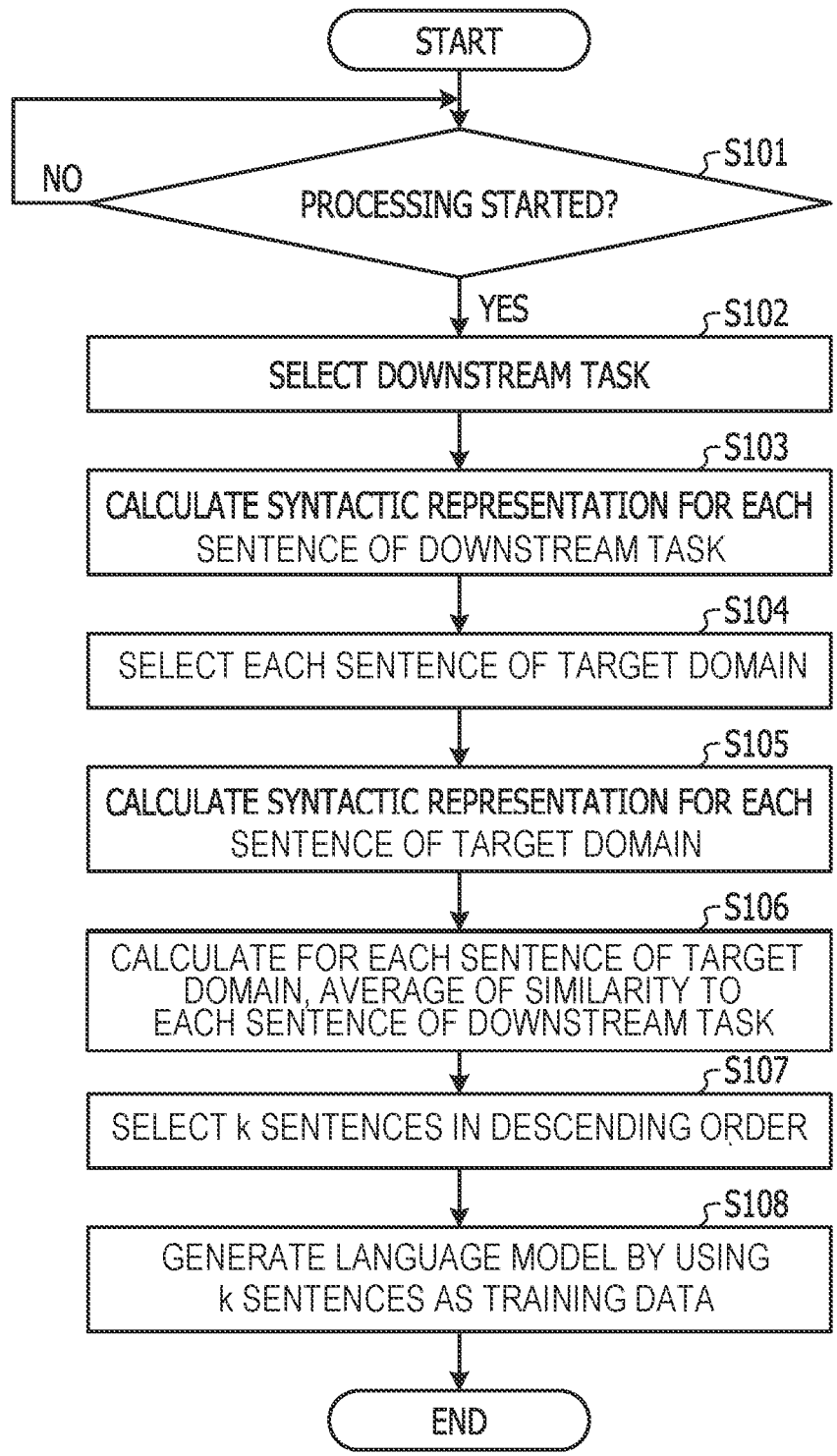
FIG. 9 is a flowchart illustrating a flow of a training process of a machine learning model.

Next, a flow of the above-described process is described. FIG. 9 is a flowchart illustrating the flow of the training process of the machine learning model. As illustrated in FIG. 9, when the processing is started (Yes in S101), the identification unit 21 selects a downstream task (S102). For example, the identification unit 21 selects one or more sentences of the downstream task in accordance with an instruction of an administrator, a schedule, or the like.

The vectorization processing unit 22 calculates the "syntactic representation" for each of the sentences of the downstream task (S103). For example, the vectorization processing unit 22 vectorizes a set of a named entity identified by the identification unit 21 and a verb closest to the named entity to calculate the "syntactic representation".

Also, the identification unit 21 selects each of the sentences of the target domain (S104). For example, the identification unit 21 selects each of the sentences belonging to the target domain independently of the subdomains of the target domain.

The vectorization processing unit 22 calculates "syntactic representation" for each of the sentences of the target domain (S105). For example, the vectorization processing unit 22 vectorizes a set of a named entity identified by the identification unit 21 and a verb closest to the named entity to calculate the "syntactic representation".

Then, the selection unit 23 calculates for each of the sentences belonging to the target domain the average similarity to the sentences of the downstream task (S106). For example, the selection unit 23 calculates the similarities between the "syntactic representation" of each of the sentences belonging to the target domain and the "syntactic representation" of each of the sentences belonging to the downstream task. The selection unit 23 calculates the average of the similarities for each of the sentences belonging to the target domain.

The selection unit 23 selects k sentences in descending order of the similarities from the sentences belonging to the target domain (S107). Then, the training unit 24 generates the language model by using the above k sentences as training data (S108).

As described above, the information processing apparatus 10 may select appropriate sentences from a target domain and generate a machine learning model by domain adaptation using these sentences. Thus, the information processing apparatus 10 may more accurately determine the downstream task by using this machine learning model. Since the information processing apparatus 10 may suppress training using unnecessary training data, time taken for the domain adaptation may be decreased.

By executing each of the steps (processing) of vectorizing sentences using the named entities, extracting the feature amount of the sentences, and selecting a sentence for the domain adaptation based on the feature amount, the information processing apparatus 10 may generate a machine learning model adapted to the downstream task, and as a result, may more accurately determine the downstream task.

The information processing apparatus 10 may identify a verb closest to a named entity and generate a vector based on a set of the named entity and the verb. Accordingly, the information processing apparatus 10 may improve accuracy of the vector representation representing the feature of the sentence. As a result, since the information processing apparatus 10 may select a similar sentence by using an accurate vector representation, the information processing apparatus 10 may generated a machine learning model with high accuracy.

The information processing apparatus 10 may also provide an application that executes each of the steps (processing) of vectorizing sentences by using the named entities, extracting the feature amount of the sentences, and selecting a sentence for the domain adaptation based on the feature amount. The information processing apparatus 10 may also provide an application in which generation of a machine learning model adapted to the downstream task is included additionally to the above-described steps.

Data examples used in the above embodiment, k (k is arbitrary integer), numerical examples, the number of domains, domain examples, sentences, specific examples, and the like described above are merely exemplary and may be arbitrarily changed.

Processing procedures, control procedures, specific names, and information including various types of data and parameters described above and the drawings may be changed arbitrarily unless otherwise specified.

Each of the elements of each of the devices or apparatus illustrated in the drawings is conceptually functional one and is not necessarily configured physically as illustrated in the drawings. For example, the specific form of the distribution or integration of each of the devices or apparatus is not limited to the devices and the apparatus illustrated in the drawings. For example, the entirety or part of the devices or apparatus may be configured so as to be functionally or physically distributed or integrated in an arbitrary unit in accordance with various types of loads, usage states, or the like.

All or arbitrary part of the processing functions performed by each device or apparatus may be realized by a CPU and a program analyzed and executed by the CPU or may be realized as hardware using wired logic.

Figure 10:
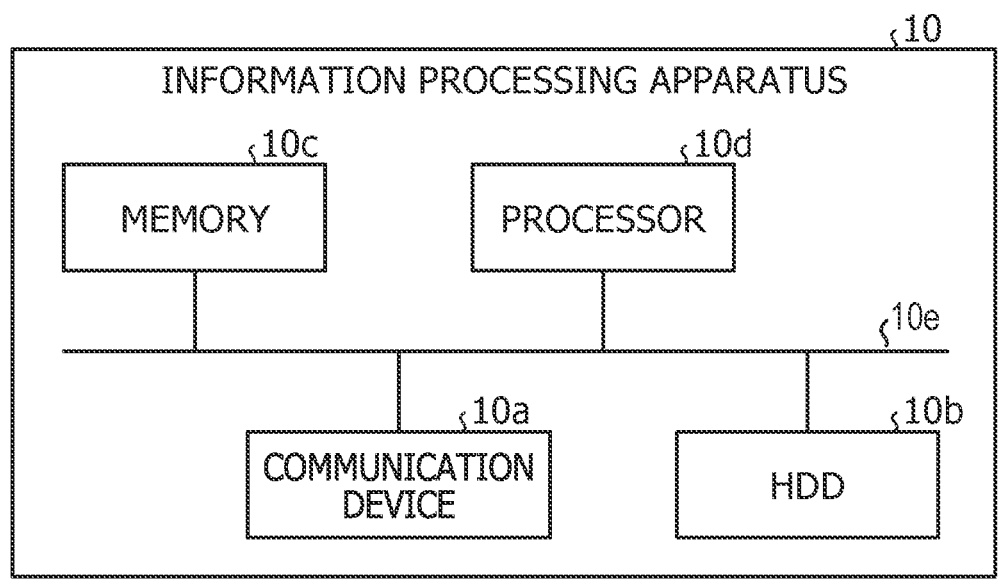
FIG. 10 is a diagram describing an example of a hardware configuration.

FIG. 10 is a diagram describing an example of a hardware configuration. As illustrated in FIG. 10, the information processing apparatus 10 includes a communication device 10a, a hard disk drive (HDD) 10b, a memory 10c, and a processor 10d. The devices illustrated in FIG. 10 are coupled to each other via a bus 10e or the like.

The communication device 10a is a network interface card or the like and communicates with another apparatus. The HDD 10b stores a program that executes processing similarly to processing of each of the processing units illustrated in FIG. 2 and a database (DB).

The processor 10d causes a process that executes the functions illustrated in, for example, FIG. 2 to operate by reading from the HDD 10b or the like the program that executes processing similarly to processing of each of the processing units illustrated in FIG. 2 and loading the program onto the memory 10c. For example, this process executes the functions similar to the functions of the processing units included in the information processing apparatus 10. For example, the processor 10d reads from HDD 10b or the like the program having the functions similar to the functions of the identification unit 21, the vectorization processing unit 22, the selection unit 23, the training unit 24, and so forth. The processor 10d executes the process of executing processing similar to the processing of the identification unit 21, the vectorization processing unit 22, the selection unit 23, the training unit 24, and so forth.

As described above, the information processing apparatus 10 functions as an information processing apparatus that executes a method of machine learning by reading and executing the program. The information processing apparatus 10 may also realize the functions similar to the functions of the above-described embodiment by reading the above-described program from a recording medium with a medium reading device and executing the above-described read program. The program described for another embodiment is not limited to the program to be executed by the information processing apparatus 10. For example, the present disclosure may be similarly applied to when another computer or server executes the program or another computer and server execute the program in cooperation with each other.

The program may be distributed via a network such as the Internet. The program may be executed by being recorded on a computer-readable recording medium such as a hard disk, a flexible disk (FD), a compact disc read-only memory (CD-ROM), a magneto-optical (MO) disk, a Digital Versatile Disc (DVD) and being read out from the recording medium by a computer.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:
    identifying first named entities and first verbs in a dependent relationship respectively with the first named entities from each of a plurality of sentences;
    vectorizing each of the plurality of sentences based on the first named entities and the first verbs;
    identifying, out of the plurality of sentences, one or more sentences each having a similarity greater than or equal to a threshold with respect to a specific sentence based on a plurality of vectors generated by the vectorizing, the similarity between two sentences being defined as a similarity between vectors generated by vectorizing the two sentences;
    identifying first combinations of the first named entities and the first verbs for each of the plurality of sentences;
    calculating a first average vector of vectors obtained respectively from the first combinations for each of the plurality of sentences; and
    identifying the one or more sentences based on the first average vector calculated for each of the plurality of sentences; and
    executing training of a machine learning model based on the one or more sentences.

2. The non-transitory computer-readable recording medium according to claim 1, the process further comprising:
    identifying second named entities and second verbs in a dependent relationship respectively with the second named entities from the specific sentence;
    vectorizing the specific sentence based on the second named entities and the second verbs;
    identifying second combinations of the second named entities and the second verbs for the specific sentence;
    calculating a second average vector of vectors obtained respectively from the second combinations for the specific sentence;
    calculating similarities between the first average vector and the second average vector respectively for the plurality of sentences; and
    identifying a predetermined number of the sentences from among the plurality of sentences in descending order of the similarities.

3. The non-transitory computer-readable recording medium according to claim 1, the process further comprising:
    identifying as the first verbs, verbs at a smallest distance respectively from the first named entities; and
    identifying as the first combinations, combinations of the first named entities and the first verbs respectively at the smallest distance from the first named entities.

4. A method of machine learning, the method comprising:
    identifying, by a computer, first named entities and first verbs in a dependent relationship respectively with the first named entities from each of a plurality of sentences;
    vectorizing each of the plurality of sentences based on the first named entities and the first verbs;
    identifying, out of the plurality of sentences, one or more sentences each having a similarity greater than or equal to a threshold with respect to a specific sentence based on a plurality of vectors generated by the vectorizing, the similarity between two sentences being defined as a similarity between vectors generated by vectorizing the two sentences;
    identifying first combinations of the first named entities and the first verbs for each of the plurality of sentences;
    calculating a first average vector of vectors obtained respectively from the first combinations for each of the plurality of sentences; and
    identifying the one or more sentences based on the first average vector calculated for each of the plurality of sentences; and
    executing training of a machine learning model based on the one or more sentences.

5. An information processing apparatus, comprising:
    a memory; and
    a processor coupled to the memory and the processor configured to:
    identify first named entities and first verbs in a dependent relationship respectively with the first named entities from each of a plurality of sentences;
    vectorize each of the plurality of sentences based on the first named entities and the first verbs;
    identify, out of the plurality of sentences, one or more sentences each having a similarity greater than or equal to a threshold with respect to a specific sentence based on a plurality of vectors generated by the vectorization, the similarity between two sentences being defined as a similarity between vectors generated by vectorization the two sentences;
    identifying first combinations of the first named entities and the first verbs for each of the plurality of sentences;
    calculating a first average vector of vectors obtained respectively from the first combinations for each of the plurality of sentences; and
    identifying the one or more sentences based on the first average vector calculated for each of the plurality of sentences; and
    execute training of a machine learning model based on the one or more sentences.

* * * * *